(12) United States Patent
Leskinen et al.

(10) Patent No.: US 8,975,333 B2
(45) Date of Patent: Mar. 10, 2015

(54) METHOD FOR IMPROVING FLOWABILITY OF RANDOM POLYPROPYLENE POWDER

(75) Inventors: Pauli Leskinen, Helsinki (FI); Olli Tuominen, Helsinki (FI); Veli-Matti Keinänen, Vantaa (FI)

(73) Assignee: Borealis AG, Vienna (AT)

( * ) Notice: Subject to any disclaimer, the term of this patent is extended or adjusted under 35 U.S.C. 154(b) by 635 days.

(21) Appl. No.: 12/998,707

(22) PCT Filed: Nov. 18, 2009

(86) PCT No.: PCT/EP2009/065386
§ 371 (c)(1),
(2), (4) Date: Aug. 1, 2011

(87) PCT Pub. No.: WO2010/057916
PCT Pub. Date: May 27, 2010

(65) Prior Publication Data
US 2011/0294937 A1    Dec. 1, 2011

(30) Foreign Application Priority Data
Nov. 21, 2008   (EP) .................................... 08169606

(51) Int. Cl.
| | | |
|---|---|---|
| C08L 23/10 | (2006.01) | |
| C08L 23/18 | (2006.01) | |
| C08L 23/16 | (2006.01) | |
| C08K 5/13 | (2006.01) | |
| C08K 5/101 | (2006.01) | |
| C08K 3/36 | (2006.01) | |
| C08K 3/22 | (2006.01) | |
| C08K 3/34 | (2006.01) | |
| C08K 3/26 | (2006.01) | |
| C08F 210/06 | (2006.01) | |

(52) U.S. Cl.
CPC ..................... C08F 210/06 (2013.01)
USPC ............. 525/53; 524/318; 524/528; 524/427; 524/433; 524/436; 524/451; 524/450

(58) Field of Classification Search
CPC ......... C08L 23/10; C08L 23/18; C08L 23/16; C08K 5/13; C08K 3/36; C08K 3/22; C08K 3/26
USPC ......... 524/528, 318, 427, 433, 436, 451, 450; 525/53
See application file for complete search history.

(56) References Cited

FOREIGN PATENT DOCUMENTS

| | | |
|---|---|---|
| EP | 1 270 628 | 1/2003 |
| EP | 0 887 379 | 12/2004 |
| EP | 1935938 | * 12/2006 |
| EP | 1 788 023 | 5/2007 |
| EP | 1 935 938 | 6/2008 |
| WO | WO 92/12182 | 7/1992 |
| WO | WO 99/24478 | 5/1999 |
| WO | WO 99/24479 | 5/1999 |
| WO | WO 00/68315 | 11/2000 |
| WO | WO 2004/000899 | 12/2003 |
| WO | WO 2004/111095 | 12/2004 |

* cited by examiner

*Primary Examiner* — James J Seidleck
*Assistant Examiner* — Deve E Valdez
(74) *Attorney, Agent, or Firm* — Warn Partners, P.C.

(57) ABSTRACT

Method for the preparation of a sticky random propylene copolymer (R-PP) in a reactor facility comprising in series (i) a first reaction system, (ii) a first conveying line connecting the first reactor system with a second reactor system comprising an outlet, (iii) a second conveying line connecting the outlet with a purge bin comprising a feeder, and (iv) a conveying system being connected with the feeder, and the preparation of said random propylene copolymer (R-PP) comprises the steps in the order of (a) producing in said first reactor system a propylene homopolymer (H-PP) or a random propylene copolymer (R-PP1), (b) transferring at least a part of said polypropylene to said second reactor system via the first conveying line, (c) producing in said second reactor system a random propylene copolymer (R-PP2) obtaining the random propylene copolymer (R-PP), (d) discharging said random propylene copolymer (R-PP) from said second reactor system via the outlet, (e) transferring said discharged random propylene copolymer (R-PP) via the second conveying line to said purge bin comprising said feeder, and (f) transferring further said discharged random propylene copolymer (R-PP) from said purge bin via said feeder to said conveying system, the produced random propylene copolymer (R-PP) is provided with an additive, said additive is fed to the produced random propylene copolymer (R-PP) (α) at the outlet of the second reactor system, or (β) at the feeder (F) of the purge bin (PB).

15 Claims, 2 Drawing Sheets

METHOD FOR IMPROVING FLOWABILITY OF RANDOM POLYPROPYLENE POWDER

This application is a National Stage of International Application No. PCT/EP2009/065386, filed Nov. 18, 2009. This application claims priority to European Patent Application No. 08169606.4, filed on Nov. 21, 2008. The disclosures of the above applications are incorporated herein by reference.

The present invention relates to a new method for the preparation of a random propylene copolymer (R-PP) with a high amount of xylene cold solubles.

Propylene homopolymers have high resistance to heat and chemicals as well as beneficial mechanical properties. However, other properties of propylene homopolymers such as impact strength, in particular at low temperature, flexibility, clarity or haze need to be improved for specific applications.

It is known that mechanical properties such as impact strength or optical properties can be improved by copolymerising propylene with ethylene or other α-olefins. If these comonomers are randomly distributed within the polymeric chain, a propylene random copolymer is obtained. Propylene random copolymers are inter alia used in blow moulding, injection moulding, and film extrusion applications for the preparation of materials such as food packaging, medical packaging, and consumer products.

For specific applications, a high amount of comonomers needs to be incorporated into the polypropylene, e.g. to provide a material having a higher flexibility and softness, improving also impact strength. Furthermore, optical properties as well as sealability are improved with polypropylene having higher comonomer content. However, the higher the comonomer content, the higher is the risk that the polymer material causes stickiness problems.

Sticky material tends to agglomerate and leading to sheeting in the transfer lines, hoppers and vessels. In severe cases the random propylene copolymer powder (R-PP) may also cause blocking of the system. This stickiness problem occurs in particular in the bottom of the purge bin, the rotary feeder and the conveying line to the extruder or to the powder bin as well as in the powder bin itself. In other words the stickiness problem is in particular imminent before the random propylene copolymer powder (R-PP) has been extruded to pellets.

The finding of the present invention is that a random propylene copolymer (R-PP), i.e. a random propylene copolymer powder (R-PP), being sticky due to the high comonomer content must be surface coated with an additive after the polymerisation before it is conveyed to other units of the polymerization facility.

Accordingly the present invention is directed to a method for the preparation of a random propylene copolymer (R-PP) in a reactor facility, wherein (A) the reactor facility comprises in series
  (i) a first reactor system ($1^{st}$ RS) comprising at least a slurry reactor (SR) and/or at least one gas phase reactor (GPR), preferably a first reactor system ($1^{st}$ RS) comprising only one slurry reactor (SR) as polymerization unit, i.e. a first reactor system ($1^{st}$ RS) consisting of one slurry reactor (SR),
  (ii) a first conveying line (CL 1) connecting the first reactor system ($1^{st}$ RS) with a second reactor system ($2^{nd}$ RS),
  (iii) the second reactor system ($2^{nd}$ RS) comprising at least one gas phase reactor (GPR) and an outlet (O), preferably the second reactor system ($2^{nd}$ RS) comprising only one gas phase reactor (GPR) as polymerization unit and an outlet (O),
  (iv) a second conveying line (CL 2) connecting the outlet (O) of the second reactor system ($2^{nd}$ RS) with a purge bin (PB) comprising a feeder (F),
  (v) a conveying system (C) optionally comprising a powder silo (PS),
  (vi) the conveying system (C) being connected with the feeder (F) of the purge bin (PB), and
  (vii) optionally an extruder (E) connected with the conveying system (C), (B) the preparation of said random propylene copolymer (R-PP) comprises the steps in the order of
  (a) producing in said first reactor system ($1^{st}$ RS) a propylene polymer (H-PP) or a random propylene copolymer (R-PP1),
  (b) transferring at least a part of said propylene polymer (H-PP) or at least a part of said random propylene copolymer (R-PP1), preferably at least 90 wt.-% of said propylene polymer (H-PP) or of said random propylene copolymer (R-PP1), to said second reactor system ($2^{nd}$ RS) via the first conveying line (CL 1),
  (c) producing in said second reactor system ($2^{nd}$ RS) in the presence of said propylene polymer (H-PP) or in the presence of said random propylene copolymer (R-PP1) a further random propylene copolymer (R-PP2) obtaining the random propylene copolymer (R-PP),
  (d) discharging said random propylene copolymer (R-PP) from said second reactor system ($2^{nd}$ RS) via the outlet (O),
  (e) transferring said discharged random propylene copolymer (R-PP) via the second conveying line (CL 2) to said purge bin (PB) comprising said feeder (F), and
  (f) transferring further said discharged random propylene copolymer (R-PP) from said purge bin (PB) via said feeder (F) to said conveying system (C), optionally to said powder silo (PS) of the conveying system (C),
  (g) optionally extruding the random propylene copolymer (R-PP) in the extruder (E) to pellets, (C) the produced random propylene copolymer (R-PP) is provided with an additive (A), said additive (A) is fed to the produced random propylene copolymer (R-PP)
  (α) at the outlet (O) of the second reactor system ($2^{nd}$ RS), and/or
  (β) at the purge bin (PB), preferably at the conical part of the purge bin (PB), and/or
  (γ) at the feeder (F), i.e. at the rotary feeder, preferably at the conical part of the feeder (F), i.e. at the conical part of the rotary feeder, of the purge bin (PB), and/or
  (δ) at the powder silo (PS), preferably at the conical part of the powder silo (PS), and/or
  (ε) at the second conveying line (CL 2) between the outlet (O) and the purge bin (PB), and/or
  (ζ) at the conveying system (C) between the feeder (F) and the powder silo (PS), and (D) the produced random propylene copolymer (R-PP) after being treated with the additive (A), i.e. after having left the powder silo (PS) and/or the purge bin (PB),
  (i) has a xylene cold soluble fraction (XCS) of at least 5 wt.-% and
  (ii) comprises units derived from at least one C2 to C20 α-olefin other than propylene in an amount of 4.0 to 25.0 wt.-%.

Preferably the random propylene copolymer (R-PP2) comprises more units derived from at least one C2 to C20 α-olefin other than propylene compared to said propylene polymer (H-PP) or said random propylene copolymer (R-PP1).

According to a specific embodiment the present invention is directed to a method for the preparation of a random propylene copolymer (R-PP) in a reactor facility wherein (A) the reactor facility comprises in series
- (i) a first reactor system ($1^{st}$ RS) comprising at least a slurry reactor (SR) and/or at least one gas phase reactor (GPR), preferably a first reactor system ($1^{st}$ RS) comprising only one slurry reactor (SR) as polymerization unit, i.e. a first reactor system ($1^{st}$ RS) consisting of one slurry reactor (SR),
- (ii) a first conveying line (CL 1) connecting the first reactor system ($1^{st}$ RS) with a second reactor system ($2^{nd}$ RS),
- (iii) the second reactor system ($2^{nd}$ RS) comprising at least one gas phase reactor (GPR) and an outlet (O), preferably the second reactor system ($2^{nd}$ RS) comprising only one gas phase reactor (GPR) as polymerization unit and an outlet (O),
- (iv) a second conveying line (CL 2) connecting the outlet (O) of the second reactor system ($2^{nd}$ RS) with a purge bin (PB) comprising a feeder (F),
- (v) a conveying system (C) optionally comprising a powder silo (PS),
- (vi) the conveying system (C) being connected with the feeder (F) of the purge bin (PB), and
- (vii) optionally an extruder (E) connected with the conveying system (C), (B) the preparation of said random propylene copolymer (R-PP) comprises the steps in the order of
- (a) producing in said first reactor system ($1^{st}$ RS) a propylene homopolymer (H-PP) or a random propylene copolymer (R-PP1),
- (b) transferring at least a part of said a propylene homopolymer (H-PP) or at least a part of said random propylene copolymer (R-PP1), preferably at least 90 wt.-% of said propylene homopolymer (H-PP) or of said random propylene copolymer (R-PP1), to said second reactor system ($2^{nd}$ RS) via the first conveying line (CL 1),
- (c) producing in said second reactor system ($2^{nd}$ RS) in the presence of said propylene polymer (H-PP) or said random propylene copolymer (R-PP1) a further random propylene copolymer (R-PP2) obtaining the random propylene copolymer (R-PP),
- (d) discharging said random propylene copolymer (R-PP) from said second reactor system ($2^{nd}$ RS) via the outlet (O),
- (e) transferring said discharged random propylene copolymer (R-PP) via the second conveying line (CL 2) to said purge bin (PB) comprising said feeder (F), and
- (f) transferring further said discharged random propylene copolymer (R-PP) from said purge bin (PB) via said feeder (F) to said conveying system (C), optionally to said powder silo (PS) of the conveying system (C),
- (g) optionally extruding the random propylene copolymer (R-PP) in the extruder (E) to pellets, (C) the produced random propylene copolymer (R-PP) is provided with an additive (A), said additive (A) is fed to the produced random propylene copolymer (R-PP)
- (α) at the outlet (O) of the second reactor system ($2^{nd}$ RS), and/or
- (β) at the purge bin (PB), preferably at the conical part of the purge bin (PB), and/or
- (γ) at the feeder (F), preferably at the conical part of the feeder (F), of the purge bin (PB), and/or
- (δ) at the second conveying line (CL 2) between the outlet (O) and the purge bin (PB), and (D) the produced random propylene copolymer (R-PP) after being treated with the additive (A), i.e. after having left the purge bin (PB) via the feeder (F),
- (i) has a xylene cold soluble fraction (XCS) of at least 5 wt.-% and
- (ii) comprises units derived from at least one C2 to C20 α-olefin other than propylene in an amount of 4.0 to 25.0 wt.-%.

Preferably the random propylene copolymer (R-PP2) comprises more units derived from at least one C2 to C20 α-olefin other than propylene compared to said propylene polymer (H-PP) or said random propylene copolymer (R-PP1).

It has been surprisingly found out that the addition of an additive (A) after the polymerization of the random propylene copolymer (R-PP2) but before leaving the powder silo (PS), in particular before leaving the purge bin (PB), reduces the stickiness problems and increases significantly the flowability of the random propylene copolymer (R-PP), i.e. of the random propylene copolymer powder (R-PP), in the transfer lines.

BRIEF DESCRIPTION OF THE DRAWINGS

The present invention will become more fully understood from the detailed description and the accompanying drawings, wherein.

Figure 1:
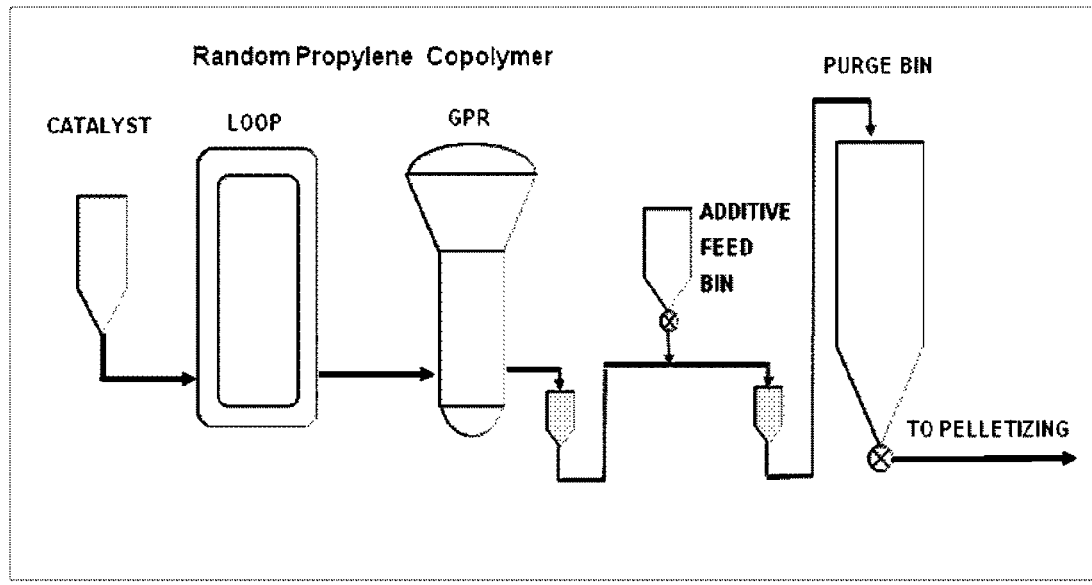
FIG. 1 is a schematic diagram of reactor systems for the preparation of a random propylene copolymer.

In the following the invention will be described in more detail. First the random propylene copolymer (R-PP) produced according to the inventive process will be defined more precisely.

Throughout the present invention, whenever the properties of the random propylene copolymer (R-PP) are described, the properties of the random propylene copolymer (R-PP) are meant which has been already treated with the additive (A). Accordingly whenever the properties of the random propylene copolymer (R-PP) are described, preferably the properties of the random propylene copolymer (R-PP) are meant which has left the powder silo (PS), preferably which has left the feeder (F) of the purge bin (PB), of the process facility, in case not otherwise defined.

The process of the invention is suitable for any random propylene copolymer (R-PP), however in particular to a random propylene copolymer (R-PP) with a high xylene cold soluble fraction (XCS). Accordingly the present invention is directed to the preparation of the random propylene copolymer (R-PP) having a xylene cold soluble fraction (XCS) of at least 5 wt.-%, more preferably of at least 7 wt.-%, yet more preferably of at least 9 wt.-%, still more preferably of at least 12 wt.-%, like of at least 15 wt.-%. Thus the xylene cold soluble fraction (XCS) of the random propylene copolymer (R-PP) is preferably in the range of 5 to 50 wt.-%, more preferably in the range of 12 to 40 wt.-%, like 15 to 30 wt.-%. In another preferred embodiment, which is in particular preferred, the xylene cold soluble fraction (XCS) of the random propylene copolymer (R-PP) is in the range of 5 to 25 wt.-%, more preferably in the range of 5 to 20 wt.-%, like 5 to 15 wt.-%.

The high xylene cold soluble fraction (XCS) is mainly caused due to the rather high amount of units derived from $C_2$ to $C_{20}$ α-olefins other than propylene within the propylene copolymer (R-PP). Accordingly it is appreciated that the propylene copolymer (R-PP) comprises units derived from at least one C2 to C20 α-olefin other than propylene in an amount of 4.0 to 25.0 wt.-%, more preferably in the amount of 5.0 to 22.0 wt.-%, like 10.0 to 20.0 wt.-%. In another preferred embodiment, which is in particular preferred, the propylene copolymer (R-PP) comprises units derived from at least one C2 to C20 α-olefin other than propylene in an amount of 4 to 25 wt.-%, more preferably in an amount of 4 to 20 wt,-%, like 4 to 15 wt.-%.

Further propylene copolymer (R-PP) to be produced according to the process of the present invention may comprise any suitable α-olefin other than propylene. However it is appreciated that the propylene copolymer (R-PP) comprises, preferably consists of, units derivable from propylene and at least another α-olefin selected from the group consisting of ethylene and C4 to C20 α-olefin, like C4 to C10 α-olefin, more preferably units derivable from propylene and at least another α-olefin selected form the group consisting of ethylene, 1-butene, 1-pentene, 1-hexene, 1-heptene and 1-octene. Preferably the propylene copolymer (R-PP) comprises at least units derivable from propylene and ethylene and may comprise other units derivable from a further α-olefin as defined in this paragraph. However it is in particular preferred that propylene copolymer (R-PP) comprises units only derivable from propylene and ethylene. Thus a random ethylene-propylene polymer as random propylene copolymer (R-PP) is most preferred.

As set out above one requirement in the present invention is that units derived from $C_2$ to $C_{20}$ α-olefins other than propylene within the propylene copolymer (R-PP) to be produced are randomly distributed. The randomness indicates the amount of isolated comonomer units, i.e. those which have no other comonomer units in the neighbour, compared to the total amount of comonomers in the polymer chain. In a preferred embodiment, the randomness of the random propylene copolymer (R-PP) is at least 30%, more preferably at least 50%, even more preferably at least 60%, and still more preferably at least 65%.

Preferably the random propylene copolymer (R-PP) to be produced is isotactic. Accordingly it is appreciated that the random propylene copolymer (R-PP) has a rather high pentad concentration, i.e. higher than 90%, more preferably higher than 92%, still more preferably higher than 93% and yet more preferably higher than 95%, like higher than 99%.

Further and preferably the random propylene copolymer (R-PP) has a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the random propylene copolymer (R-PP) has an $MFR_2$ (230° C.) in a range of 0.05 to 200.0 g/10 min, more preferably of 0.5 to 150.0 g/10 min, still more preferably of 1.0 to 50.0 g/10 min.

As stated above the random propylene copolymer (R-PP) is produced in at least two reactor systems wherein in the first reactor system ($1^{st}$ RS) a propylene homopolymer (H-PP) or a random propylene copolymer (R-PP1) is produced and in the second reactor system ($2^{nd}$ RS) the random propylene copolymer (R-PP2) is obtained.

In the first reactor system ($1^{st}$ RS) a polymer component of the random propylene copolymer (R-PP) is produced with a rather low commoner content, i.e. a polypropylene with rather low amounts of units derived from $C_2$ to $C_{20}$ α-olefins other than propylene, and in the second reactor system ($2^{nd}$ RS) a propylene copolymer is produced with rather high amounts of units derived from $C_2$ to $C_{20}$ α-olefins other than propylene. Accordingly the random propylene copolymer (R-PP2) produced in the second reactor system ($2^{nd}$ RS) has a higher comonomer content, i.e. higher amounts of units derived from $C_2$ to $C_{20}$ α-olefins other than propylene, as the propylene homopolymer (H-PP) or the propylene copolymer (R-PP1) produced in the first reactor system ($1^{st}$ RS). As a consequence thereof the xylene cold soluble fraction (XCS) of the propylene homopolymer (H-PP) or the propylene copolymer (R-PP1) is lower compared to the xylene cold soluble fraction (XCS) of the random propylene copolymer (R-PP2).

It is preferred that the production split between the first reactor system ($1^{st}$ RS) and the second reactor system ($2^{nd}$ RS) is from 30:70 to 70:30, more preferred from 40:60 to 60:40.

Keeping the above in mind the propylene copolymer (R-PP) can be unimodal or multimodal, like bimodal in view of the molecular weight distribution and/or the comonomer content distribution.

The expression "multimodal" or "bimodal" used herein refers to the modality of the polymer, i.e.

the form of its molecular weight distribution curve, which is the graph of the molecular weight fraction as a function of its molecular weight, or more preferably the form of its comonomer content distribution curve, which is the graph of the comonomer content as a function of the molecular weight of the polymer fractions.

As will be explained below, the polymer components of the propylene copolymer (R-PP) are produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the propylene copolymer (R-PP) can be multimodal, like bimodal, in view of the comonomer content and/or molecular weight. It is in particular appreciated that the propylene copolymer (R-PP) is multimodal, like bimodal, in view of the comonomer content.

Further in case the propylene copolymer (R-PP) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the propylene copolymer (R-PP). Accordingly in case of a bimodal system, in particular in view of the comonomer content, the split of the two fractions is roughly 50:50. Thus in a preferred embodiment the propylene copolymer (R-PP) comprises two fractions which differ in their comonomer content, like ethylene content, wherein the first fraction is present from 30 to 70 wt.-% and the second fraction from 70 to 30 wt.-%.

The difference of the comonomer content between the two fractions is defined in a way of a preferred embodiment in the following paragraph.

Therefore it is preferred that the random propylene copolymer (R-PP) comprises two fractions, one fraction being either a propylene homopylemer (H-PP) or a random propylene copolymer (R-PP1) and said fraction being produced in the first reactor system ($1^{st}$ RS) and the other fraction being a random propylene copolymer (R-PP2) produced in the second reactor system ($2^{nd}$ RS). Further these two fractions have at least a different comonomer content. Even more preferred the random propylene copolymer (R-PP) comprises at least two fractions, more preferably consists of two fractions, that have a comonomer content, like ethylene content, which differ of at least 2.0 wt.-%, more preferably differ of at least 3.0 wt.-%, like of at least 3.5 wt.-%. On the other hand the difference in the comonomer content in the two fractions should be not too high, i.e. not higher than 15.0 wt.-%, preferably not higher than 12.0 wt %, to avoid any separation tendencies. Thus it is appreciated that the random propylene copolymer (R-PP) comprises at least two fractions, more preferably consists of two fractions, that have comonomer contents which differ of 2.0 to 20.0 wt.-%, more preferably of 3.0 to 15.0 wt.-%. Accordingly in one embodiment the random propylene copolymer (R-PP) consists of a first fraction being a propylene homopolymer (H-PP) and a second fraction being a random propylene copolymer (R-PP2) having a comonomer content, preferably ethylene content, of at least 6.0 wt.-%, more preferably of at least 10.0 wt.-%, like of at least 12.5 wt.-%.

In the following the individual components produced in the first reactor system ($1^{st}$ RS) and in the second reactor system ($2^{nd}$ RS) are described in more detail.

As stated above the polymer produced in the first reactor system can be either a propylene homopolymer (H-PP) or a random propylene copolymer (R-PP1). In case it is a propylene homopolymer (H-PP) it is appreciated that it is an isotactic propylene homopolymer. Accordingly it is appreciated that the propylene homopolymer (H-PP) has a rather high pentad concentration, i.e. higher than 90%, more preferably higher than 92%, still more preferably higher than 93% and yet more preferably higher than 95%, like higher than 99%.

The expression homopolymer used in the instant invention relates to a polypropylene that consists substantially, i.e. of at least 97 wt.-%, preferably of at least 98 wt.-%, more preferably of at least 99 wt.-%, still more preferably of at least 99.8 wt.-% of propylene units. In a preferred embodiment only propylene units in the propylene homopolymer are detectable. The comonomer content can be determined with FT infrared spectroscopy, as described below in the examples.

Preferably the xylene cold soluble fraction (XCS) of the propylene homopolymer (H-PP) is a rather low. Accordingly the propylene homopolymer (H-PP) has preferably a xylene cold soluble fraction (XCS) measured according to ISO 6427 (23° C.) of not more than 5.0 wt-%, more preferably of not more than 4.0 wt.-%, yet more preferably of not more than 3.5 wt.-%, like not more than 2.5 wt.-%. Thus a preferred range is 0.5 to 5.0 wt.-%, more preferred 1.0 to 4.0 wt.-%, still more preferred 1.2 to 3.5 wt.-%.

In case the polymer produced in the first reactor system ($1^{st}$ RS) is a random propylene copolymer (R-PP1) it is preferred that said propylene copolymer (R-PP1) comprises, preferably consists of, units derivable from propylene and at least another α-olefin selected from the group consisting of ethylene and C4 to C20 α-olefin, like C4 to C10 α-olefin, more preferably units derivable from propylene and at least another α-olefin selected form the group consisting of ethylene, 1-butene, 1-pentene, 1-hexene, 1-heptene and 1-octene. Preferably the propylene copolymer (R-PP1) comprises at least units derivable from propylene and ethylene and may comprise other units derivable from a further α-olefin as defined in this paragraph. However it is in particular preferred that the random propylene copolymer (R-PP1) comprises units only derivable from propylene and ethylene. Thus a random ethylene-propylene polymer as random propylene copolymer (R-PP1) is most preferred.

The amount of C2 to C20 α-olefins other than propylene in the random propylene copolymer (R-PP1) shall be rather low to keep the xylene cold soluble (XCS) on a relative low level.

Accordingly it is appreciated that the random propylene copolymer (R-PP1) produced in the first reactor system ($1^{st}$ RS) has an amount of units derived from ethylene and C4 to C20 α-olefins, like ethylene, 1-butene and/or 1-hexene, in the range of 1.0 to 10.0 wt.-%, more preferably in the range of 1.5 to 9.0 wt.-% and yet more preferably in the range of 3.0 to 8.0 wt.-%.

Further it is appreciated that such a random propylene copolymer (R-PP1) has a rather low xylene cold soluble fraction (XCS). Accordingly it is appreciated that the random propylene copolymer (R-PP1) has a xylene cold soluble fraction (XCS) of not more than 5.0 wt.-%, preferably of not more than 4.0 wt.-%, like not more than 3.0 wt.-%, like not more than 2.5 wt.-%. Thus a preferred range is 0.5 to 5.0 wt.-%, more preferred 1.0 to 4.0 wt.-%, still more preferred 1.2 to 3.6 wt.-%.

Of course it is further preferred that the random propylene copolymer (R-PP1) is isotactic. Accordingly it is appreciated that the random propylene copolymer (R-PP1) has a rather high pentad concentration, i.e. higher than 90%, more preferably higher than 92%, still more preferably higher than 93% and yet more preferably higher than 95%, like higher than 99%.

Concerning the random distribution of the comonomers of the random propylene copolymer (R-PP1) it is appreciated that the randomness is at least 30%, more preferably at least 50%, even more preferably at least 60%, and still more preferably at least 65%.

On the other hand the random propylene copolymer (R-PP2) produced in the second reactor system ($2^{nd}$ RS) is a rather high commoner content and therewith a rather high xylene cold soluble fraction (XCS).

Thus the random propylene copolymer (R-PP2) produced in the second reactor system ($2^{nd}$ RS) preferably has units derived from C2 to C20 α-olefins other than propylene in an amount of at least 4.0 wt.-%, more preferably at least 5.0 wt.-%. Thus the amount of units derived from C2 to C20 α-olefins other than propylene in the random propylene copolymer (R-PP2) is preferably in the range of 6.0 to 35.0 wt.-%, more preferably in the range of 11.0 to 30.0 wt.-%.

The random propylene copolymer (R-PP2) comprises, preferably consists of, units derivable from propylene and at least another α-olefin selected from the group consisting of ethylene and C4 to C20 α-olefin, like C4 to C10 α-olefin, more preferably units derivable from propylene and at least another α-olefin selected form the group consisting of ethylene, 1-butene, 1-pentene, 1-hexene, 1-heptene and 1-octene. Preferably the propylene copolymer (R-PP2) comprises at least units derivable from propylene and ethylene and may comprise other units derivable from a further α-olefin as defined in this paragraph. However it is in particular preferred that the random propylene copolymer (R-PP2) comprises units only derivable from propylene and ethylene. Thus a random ethylene-propylene polymer as random propylene copolymer (R-PP2) is most preferred.

Further the random propylene copolymer (R-PP2) is featured by a rather high xylene cold soluble fraction (XCS) content. Accordingly the random propylene copolymer (R-PP2) preferably has a xylene cold soluble fraction (XCS) of more than 5.0 wt.-%, preferably of more than 8.0 wt.-%, like more than 10.0 wt.-%. Thus a preferred range is 5.5 to 36.0 wt.-%, more preferred 8.0 to 30.0 wt.-%, still more preferred 10.0 to 28.0 wt.-%.

Further the random propylene copolymer (R-PP2) is preferably isotactic. Accordingly it is appreciated that the random propylene copolymer (R-PP2) has a rather high pentad concentration, i.e. higher than 90%, more preferably higher than 92%, still more preferably higher than 93% and yet more preferably higher than 95%, like higher than 99%.

Concerning the random distribution of the comonomers of the random propylene copolymer (R-PP2) it is appreciated that the randomness is at least 30%, more preferably at least 50%, even more preferably at least 60%, and still more preferably at least 65%.

The above defined random propylene copolymer (R-PP) is obtained in an at least two reactor system known in the art. Accordingly the reactor facility comprises in series
(i) a first reactor system ($1^{st}$ RS) comprising at least a slurry reactor (SR) and/or at least one gas phase reactor (GPR), preferably a first reactor system ($1^{st}$ RS) comprising only one slurry reactor (SR) as polymerization unit, i.e. a first reactor system ($1^{st}$ RS) consisting of one slurry reactor (SR),
(ii) a first conveying line (CL 1) connecting the first reactor system ($1^{st}$ RS) with a second reactor system ($2^{nd}$ RS),
(iii) the second reactor system ($2^{nd}$ RS) comprising at least one gas phase reactor (GPR) and an outlet (O), preferably the second reactor system ($2^{nd}$ RS) comprising only one gas phase reactor (GPR) as polymerization unit and an outlet (O),
(iv) a second conveying line (CL 2) connecting the outlet (O) of the second reactor system ($2^{nd}$ RS) with a purge bin (PB) comprising a feeder (F),
(v) a conveying system (C) optionally comprising a purge silo (PS)
(vi) the conveying system (C) being connected with the feeder (F) of the purge bin (PB), and
(vii) optionally an extruder (E) connected with the conveying system (C), Accordingly the first reactor system ($1^{st}$ RS) must comprise a slurry reactor and/or a gas phase reactor (GPR). It is therefore in particular appreciated that the first reactor system ($1^{st}$ RS) comprises at least one slurry reactor and may comprise additional reactors, for instance a further slurry reactor and/or a gas phase reactor (GPR). In a preferred embodiment the first reactor system ($1^{st}$ RS) comprises, more preferably consist of, a slurry reactor (SR) (see FIGS. 1 and 2).

A slurry reactor (SR) according to this invention designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor (SR) comprises (is) a (bulk) loop reactor.

"Gas phase reactor" means any mechanically mixed or fluid bed reactor. Preferably the gas phase reactor comprises a mechanically agitated fluidized bed reactor with gas velocities of at least 0.2 msec.

The reaction conditions are well known in the art and not particular subject of this application. The reaction conditions are in particular chosen in such a way that the above defined properties of the random propylene copolymer (R-PP) are obtained.

In the first reactor system ($1^{st}$ RS) the propylene homopolymer (H-PP) or the random propylene copolymer (R-PP1) as defined above is produced.

For instance, in the slurry reactor (SR) the temperature is preferably from 40 to 110° C., preferably between 50 and 95° C., in particular between 60 and 90° C., with a pressure in the range of from 20 to 80 bar, preferably 30 to 60 bar, with the option of adding—if present—the comonomer and if desired hydrogen in order to control the molecular weight in a manner known per se.

The propylene homopolymer (H-PP) or the random propylene copolymer (R-PP1) produced in the slurry reactor (SR) can be if desired transferred to a first gas phase reactor to continue the preparation of the propylene homopolymer (H-PP) or the random propylene copolymer (R-PP1). The use of a two or more reactors for the preparation of the propylene homopolymer (H-PP) or the random propylene copolymer (R-PP1) is in particular useful in case these polymers shall be multimodal, like bimodal, in view of the molecular weight and/or comonomer distribution.

Typically in the gas phase reactor (GPR) of the first reactor system ($1^{st}$ RS)—if used—the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The residence time can vary in the reactor zones identified above. In one embodiment, the residence time in the slurry reactor, for example a loop reactor, is in the range of from 0.5 to 5 hours, for example 0.5 to 2 hours, while the residence time in the gas phase reactor generally will be from 1 to 8 hours.

However it is in particular preferred that the propylene homopolymer (H-PP) or the random propylene copolymer (R-PP1) is produced in a first reactor system ($1^{st}$ RS) which comprises a slurry reactor (SR) as the only polymerization unit, i.e. the first reactor system ($1^{st}$ RS) consists of a slurry reactor (SR) only.

After the preparation of the propylene homopolymer (H-PP) or the random propylene copolymer (R-PP1) in the first reactor system ($1^{st}$ RS), said polymer is at least partially, more preferably of at least 90 wt.-%, like at least 95 wt.-%, transferred via the first conveying line (CL 1) to the second reactor system ($2^{nd}$ RS).

In case the additive (A) is externally added via an extruder as defined in detail above, then it is preferred that the total propylene homopolymer (H-PP) or the total random propylene copolymer (R-PP1) of the first reactor system ($1^{st}$ RS) is transferred to the second reactor system ($2^{nd}$ RS). In case however the additive (A) is the propylene homopolymer (H-PP) or is the random propylene copolymer (R-PP1) of the first reactor system ($1^{st}$ RS) as explained in detail below than only a part of the propylene homopolymer (H-PP) or the random propylene copolymer (R-PP1) of the first reactor system ($1^{st}$ RS) is transferred to the second reactor system ($2^{nd}$ RS).

In any case in the second reactor system ($2^{nd}$ RS) the random propylene copolymer (R-PP2) is polymerized in the presence of said propylene homopolymer (H-PP) or said random propylene copolymer (R-PP1). Thereby the random propylene copolymer (R-PP) is obtained. The second reactor system ($2^{nd}$ RS) comprises at least one gas phase reactor (GPR), preferably comprises one gas phase reactor (GPR), i.e. the second reactor system ($2^{nd}$ RS) consist of one gas phase reactor (GPR) only (see FIGS. 1 and 2).

The reaction temperature preferably used in the gas phase reactor(s) (GPR(s)) of the second reactor system ($2^{nd}$ RS) is in the range 50 to 130° C., preferably 60 to 100° C. The reactor pressure is preferably higher than 5 bars, more preferably higher than 8 bars, and preferably in the range of 5 to 50 bar, like 8 to 35 bar, and the residence time is preferably 1 to 8 hours.

The polymerization may be achieved using any standard olefin polymerization catalyst and these are well known to the person skilled in the art. Preferred catalyst systems comprise an ordinary stereospecific Ziegler-Natta catalyst, metallocene catalysts and other organometallic or coordination catalysts. A particularly preferred catalyst system is a high yield Ziegler-Natta catalyst having a catalyst component and optionally an external donor. The catalyst system may thus contain a titanium compound and an electron-donor compound supported on an activated magnesium dichloride, a trialkylaluminium compound as activator and an electron donor compound.

A further preferred catalyst system is a metallocene catalyst having a bridged structure giving high stereoselectivity and which as an active complex is impregnated on a carrier.

Suitable catalyst systems are described in for example, EP 0 491 566, EP 0 586 390 and WO 98/12234 which are hereby incorporated by reference.

A preferred process of the one used herein is the slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

After the preparation of the random propylene copolymer (R-PP) the same is discharged from the second reactor system ($2^{nd}$ RS) via the outlet (O) and transferred via second conveying line (CL 2) to the purge bin (PB) comprising the feeder (F).

The outlet (O) according to this invention can be preferably of continuous type or batch type.

The purge bin (PB) also known as steamer, product dryer, devolatizer, degasser, stripper or flash tank is used to remove residual monomers, easy volatile gaseous components like oligomers, and to remove and/or to deactivate other chemical components like residues of utilities like donors, alkyls etc. Preferably in such cases nitrogen and water vapor is used.

As known to the skilled person the purge bin (PB) has at the bottom end a conical form. At this end preferably the feeder (F) is located. The feeder (F) can be any feeder (F); however a rotary feeder (RF) is preferred. Via the feeder (F), i.e. the rotary feeder (RF), the random propylene copolymer (R-PP) is transferred to the conveying system (C) which may comprise a powder silo (PS). Optionally and preferably the conveying system (C) is connected with the extruder (E) in which the random propylene copolymer (R-PP) is pelletized. In case the conveying system (C) comprises a powder silo (PS), then the random propylene copolymer (R-PP) is transferred from the feeder (F) to a conveying line of the conveying system (C) and from there to the powder silo (PS) and optionally to a further conveying line of the conveying system (C) which is connected with the extruder (E).

Essential aspect of the inventive process is that an additive (A) is added during the overall preparation of the random propylene copolymer (R-PP). As stated above the produced random propylene copolymer (R-PP) is in particular featured by a rather high content of the random propylene copolymer (R-PP2) which leads to a high xylene cold soluble fraction (XCS) and thus to stickiness problems during the process. The stickiness problems play in particular a decisive role in the bottom of the purge bin (PB), the rotary feeder (RF) and the conveying line to the extruder or to the powder bin as well as in the powder bin itself. Due to the high stickiness of the random propylene copolymer (R-PP), i.e. of the random propylene copolymer powder (R-PP), the material tends to agglomerate and thus cause sheeting at least in the reactor facility after having discharged the polymer material from the second reactor system ($2^{nd}$ RS) via the outlet (O). In severe cases the random propylene copolymer (R-PP) may also cause blocking of the system. Thus the additive (A) is used in the present process to avoid or reduce the stickiness problem of the random propylene copolymer (R-PP) after the random propylene copolymer (R-PP) has ($\alpha$) left the outlet (O) of the second reactor system ($2^{nd}$ RS), or
($\beta$) reached the purge bin (PB), preferably reached the conical part of the purge bin (PB), or
($\gamma$) reached the feeder (F), i.e. reached the rotary feeder, preferably reached the conical part of the feeder (F), i.e. reached the conical part of the rotary feeder, of the purge bin (PB), or
($\delta$) reached the powder silo (PS), preferably reached the conical part of the powder silo (PS), or
($\epsilon$) reached a point somewhere at the second conveying line (CL 2) between the outlet (O) and the purge bin (PB), or
($\zeta$) reached a point somewhere at the conveying system (C) between the feeder (F) and the powder silo (PS).

In an especially preferred embodiment the additive (A) is used in the present process to avoid or reduce the stickiness problem of the random propylene copolymer (R-PP) after the random propylene copolymer (R-PP) has ($\alpha$) left the outlet (O) of the second reactor system ($2^{nd}$ RS), or
($\beta$) reached the purge bin (PB), preferably reached the conical part of the purge bin (PB), or
($\gamma$) reached the feeder (F) of the purge bin (PB), preferably reached the conical part of the feeder (F) of the purge bin (PB), or
($\delta$) reached a point somewhere at the second conveying line (CL 2) between the outlet (O) and the purge bin (PB).

In other words the additive (A) is used in the present process to improve the flowability of the random propylene copolymer (R-PP) after the random propylene copolymer (R-PP) has ($\alpha$) left the outlet (O) of the second reactor system ($2^{nd}$ RS), or
($\beta$) reached the purge bin (PB), preferably reached the conical part of the purge bin (PB), or
($\gamma$) reached the feeder (F), i.e. at the rotary feeder, preferably reached the conical part of the feeder (F), i.e. reached the conical part of the rotary feeder, of the purge bin (PB), or
($\delta$) reached the powder silo (PS), preferably reached the conical part of the powder silo (PS), or
($\epsilon$) reached a point somewhere at the second conveying line (CL 2) between the outlet (O) and the purge bin (PB), or
($\zeta$) reached a point somewhere at the conveying system (C) between the feeder (F) and the powder silo (PS).

Especially the additive (A) is used in the present process to improve the flowability of the random propylene copolymer (R-PP) after the random propylene copolymer (R-PP) has ($\alpha$) left the outlet (O) of the second reactor system ($2^{nd}$ RS), or (β) reached the purge bin (PB), preferably reached the conical part of the purge bin (PB), or (γ) reached the feeder (F) of the purge bin (PB), preferably reached the conical part of the feeder (F) of the purge bin (PB), or (δ) reached a point somewhere at the second conveying line (CL 2) between the outlet (O) and the purge bin (PB).

An improvement of flowability according to this invention is given in case the random propylene copolymer (R-PP) provided with an additive (A) has a higher flowability compared to the same random propylene copolymer (R-PP) but without additive (A). Even more preferred the flowability is improved by at least 10%, more preferably at least 15%, like at least 20%, wherein the improvement is calculated from formula (I)

$$\%=\{1-[\text{flowability}[s]\text{ of }(R\text{-}PP_{b1})/\text{flowability}[s]\text{ of }(R\text{-}PP_{unb1})]\}\times 100 \quad (I)$$

wherein flowability [s] of $(R\text{-}PP_{b1})$ is the flowability measured in seconds of the random propylene copolymer (R-PP) provided with an additive (A)

flowability [s] of $(R\text{-}PP_{unb1})$ is the flowability measured in seconds of the same random propylene copolymer (R-PP) as used for $(R\text{-}PP_{b1})$ but without an additive (A).

The additive (A) used in the inventive process can be any additive as long it has the capability to reduce the stickiness of the sticky surface of the random propylene copolymer (R-PP) and thus to enhance the flowability. Accordingly preferred additives (A) are those which coat at least partially, preferably substantially, the surface of the random propylene copolymer (R-PP). Such a coating allows an unhindered transport of the random propylene copolymer (R-PP) in the reactor facility without having substantial effect on the properties of the random propylene copolymer (R-PP) itself. Preferred additives are any type of polymers, in particular those similar to the propylene homopolmyer (H-PP) or the random propylene copolymer (R-PP1) and additives which must be anyway added to the random propylene copolymer (R-PP) during the compounding, i.e. extruding step. Accordingly the additive (A) is selected from the group consisting of α-olefin polymer, like polypropylene and polyethylene, for instance high density polyethylene (HDPE), linear low density polyethylene (LLDPE) or medium density polyethylene (MDPE), talc, phenolic antioxidant, stearate, like calcium stearate or magnesium stearate, silica, synthetic silica, silicate, synthetic zeolite, calcium carbonate ($CaCO_3$), magnesium oxide (MgO), magnesium hydroxide ($Mg(OH)_2$), phosphite stabilizers, UV-stabilizers, and mixtures thereof.

In case a phenolic antioxidant is used as an additive (A) than it is preferably selected from the group consisting of 2,6-di-tert. butyl-4-methyl phenol (CAS 128-37-0), pentaerythrityl-tetrakis(3-(3',5'-di-tert. butyl-4-hydroxyphenyl)-propionate (CAS 6683-19-8), octadecyl 3-(3',5'-di-tert. butyl-4-hydroxyphenyl)propionate (CAS 2082-79-3), 1,3,5-tri-methyl-2,4,6-tris-(3,5-di-tert. butyl-4-hydroxyphenyl) benzene (CAS 1709-70-2), 2,2'-thiodiethylenebis-(3,5-di-tert. butyl-4-hydroxyphenyl)-propionate (CAS 41484-35-9), calcium (3,5-di-tert. butyl-4-hydroxy benzyl monoethylphosphonate) (CAS 65140-91-2), 1,3,5-tris(3',5'-di-tert. butyl-4'-hydroxybenzyl)-isocyanurate (CAS 27676-62-6), bis-(3,3-bis-(4-'-hydroxy-3'tert. butylphenyl)butanic acid)-glycolester (CAS 32509-66-3), 4,4'-thiobis (2-tert. butyl-5-methylphenol) (CAS 96-69-5), 2,2'-metilene-bis(6-(1-methyl-cyclohexyl) para-cresol) (CAS 77-62-3), N,N'-hexamethylene bis(3,5-di-tert. butyl-4-hydroxyhydrocinnamamide (CAS 23128-74-7), 2,5,7,8-tetramethyl-2(4',8',12'-trimethyltridecyl)chroman-6-ol (CAS 10191-41-0), 2,2'-ethylidenebis (4,6-di-tert. butylphenol) (CAS 35958-30-6), 1,1,3-tris (2-methyl-4-hydroxy-5-tert. butylphenyl) butane (CAS 1843-03-4), 1,3,5-tris(4-tert. butyl-3-hydroxy-2,6-dimethylbenzyl)-1,3,5-triazine-2,4,6-(1H,3H,5H)-trione (CAS 40601-76-1), 3,9-bis(1,1-dimethyl-2-(beta-(3-tert. butyl-4-hydroxy-5-methylphenyl)propionyloxy)ethyl)-2,4,8,10-tetraoxaspiro (5,5) undecane (CAS 90498-90-1), 1,6-hexanediyl-bis(3,5-bis(1,1-dimethylethyl)-4-hydroxybenzene-propanoate) (CAS 35074-77-2), 2,6-di-tert. butyl-4-nonylphenol (CAS 4306-88-1), 4,4'-butylidenebis(6-tert. butyl-3-methylphenol) (CAS 85-60-9), 2,2'-methylene bis(4-methyl-6-tert. butylphenol) (CAS 119-47-1), triethyleneglycol-bis-(3-tert. butyl-4-hydroxy-5 methylphenyl)propionate (CAS 36443-68-2), benzenepropanoic acid, 3,5-bis(1,1-dimethylethyl)-4-hydroxy-, C13-15-branched and linear alkyl esters (CAS 171090-93-0), 6,6'-di-tert. butyl-2,2'-thiodi-p-cresol (CAS 90-66-4), diethyl ((3,5-bis(1,1-dimethylethyl)-4-hydroxyphenyl)methyl)phosphonate (CAS 976-56-7), 4,6-bis(octylthiomethyl)-o-cresol (CAS 110553-27-0), benzenepropanoic acid, 3,5-bis(1,1-dimethylethyl)-4-hydroxy-, C7-9-branched and linear alkyl esters (CAS 125643-61-0), 1,1,3-tris[2-methyl-4-[3-(3,5-di-t-butyl-4-hydroxyphenyl)propionyloxy]-5-t-butylphenyl]butane (CAS 180002-86-2), mixed styrenated phenols (CAS 61788-44-1), butylated, octylated phenols (68610-06-0), butylated reaction product of p-cresol and dicyclopentadiene (CAS 68610-51-5), tris (2,4-di-t-butylphenyl)phosphate (CAS 31570-04-4), tetrakis-(2,4-di-t-butylphenyl)-4,4'-biphenylen-di-phosphonite (CAS 38613-77-3), bis (2,4-di-t-butylphenyl)-pentaerythrityl-di-phosphite (CAS 26741-53-7), di-stearyl-pentaerythrityl-di-phosphite (CAS 3806-34-6), tris-nonylphenyl phosphite (CAS 26523-78-4), bis(2,6-di-t-butyl-4-methylphenyl)pentaerythrityl-di-phosphite (CAS 80693-00-1), 2,2'-methylenebis (4,6-di-t-butylphenyl)octyl-phosphite (CAS 126050-54-2), 1,1,3-tris (2-methyl-4-ditridecyl phosphite-5-t-butylphenyl)butane (CAS 68958-97-4), 4,4'-butylidenebis (3-methyl-6-t-butylphenyl-di-tridecyl)phosphate (CAS 13003-12-8), bis(2,4-dicumylphenyl)pentaerythritol diphosphite (154862-43-8), bis(2-methyl-4,6-bis(1,1-dimethylethyl)phenyl)phosphorous acid ethylester (CAS 145650-60-8), 2,2',2"-nitrilo triethyl-tris(3,3',5,5'-tetra-t-butyl-1,1'-biphenyl-2,2'-diyl)phosphite) (CAS 80410-33-9), phosphorous acid, cyclic butylethyl propandiol, 2,4,6-tri-t-butylphenyl ester (CAS 161717-32-4), 2,2'-ethylidenebis (4,6-di-t-butylphenyl)fluorophosphonite (CAS 118337-09-0), 6-3-(3-tert-Butyl-4-hydroxy-5-methylphenyl)propoxy)-2,4,8,10-tetra-tert. butyldibenz (d,t)(1.3.2) dioxaphosphepin (CAS 203255-81-6), tetrakis-(2,4-di-t-butyl-5-methyl-phenyl)-4,4'-biphenylen-di-phosphonite (CAS 147192-62-9), 1,3-bis-(diphenylphosphino)-2,2-dimethylpropane (CAS 80326-98-3), di-stearyl-thio-di-propionate (CAS 693-36-7), di-lauryl-thio-di-propionate (CAS 123-28-4), di-tridecyl-thio-di-propionate (CAS 10595-72-9), di-myristyl-thio-di-propionate (CAS 16545-54-3), di-octadecyl-disulphide (CAS 2500-88-1), Bis[2-methyl-4-(3-n-dodecylthiopropionyloxy)-5-tert-butylphenyl]sulfide (CAS 66534-05-2), pentaerythritol-tetrakis-(3-laurylthiopropionate) (CAS 29598-76-3), 3,3'-Thiobispropanoic acid dimethylester polymer with 1,4-cyclohexanedimethanol, octadecyl ester (CAS 63123-11-5), 4,4'-bis(1,1'-dimethylbenzyl)diphenylamine (CAS 10081-67-1), polymer of 2,2,4-trimethyl-1,2-dihydroquinoline (CAS 26780-96-1), p-(p-toluene-sulfonylamido)-diphenylamine (CAS 100-93-6), N,N'-diphenyl-p-phenylene-diamine (CAS 74-31-7), N,N'-dinaphtyl-p-phenylene-diamine (CAS 93-46-9), and p,p'-Dioctyldiphenylamine (CAS 101-67-7).

In case a silicate is used as an additive (A) than it is preferably selected from the group consisting aluminium silicate (CAS 1318-74-7), sodium aluminium silicate (CAS 1344-00-9), calcined kaolin (CAS 92704-41-1), and calcium silicate (CAS 1344-95-2).

In case a synthetic zeolite is used as an additive (A) than it is preferably sodium calcium aluminosilicate, hydrate (CAS 1344-01-0) or sodium calcium aluminosilicate, hydrate (CAS 1344-01-0).

In case a polymer is used as an additive (A) than it is preferably a polyethylene, like high density polyethylene (HDPE), preferably with a density of more than 945 kg/m$^3$, or polypropylene, like a propylene homopolymer or a random propylene copolymer, the latter is in particular preferred. Further it is appreciated that the polymer, i.e. the polyethylene or the polypropylene, has a rather low xylene cold soluble (XCS) fraction. Thus the additive (A) is preferably a polymer, i.e. the polyethylene or the polypropylene, with a xylene cold soluble fraction (XCS) of equal or below 7 wt.-%, more preferably equal or below 4 wt.-%, yet more preferably equal or below 3 wt.-%, like equal or below 2.5 wt.-%.

Preferably the additive being a polymer, i.e. the polyethylene or the polypropylene, has a melt flow rate $MFR_2$ (230° C.) in a range of 0.05 to 200.0 g/10 min, more preferably of 0.5 to 150.0 g/10 min, still more preferably of 1.0 to 100.0 g/10 min, like 1.0 to 10.0.

In a particular preferred embodiment the additive (A) is the same polypropylene as used as the propylene homopolymer (H-PP) or the random propylene copolymer (R-PP1).

Thus it is in particular preferred that the additive (A) is selected from the group consisting of talc, phenolic antioxidant, calcium stearate, $CaCO_3$, MgO, HDPE, and polypropylene, like the propylene homopolymer (H-PP) or the random propylene copolymer (R-PP1). In a specific embodiment the additive (A) is talc, calcium stearate, the propylene homopolymer (H-PP) or the random propylene copolymer (R-PP1). In a very specific embodiment the additive (A) is the random propylene copolymer (R-PP1) or the propylene homopolymer (H-PP), the latter especially preferred.

Further it is preferred that the additive (A) has a specific size. Accordingly it is appreciated that the mean particle size of equal or below 2 mm. In case the additive a polymer as defined in detail below than the mean particle size is in the range of 0.01 to 2.00 mm, more preferably in the range of 0.03 to 1.50 mm. In all other cases the mean particle size is preferably below 1.00 mm, i.e. in the range of 0.005 to 0.05 mm, like 0.09 to 0.02 mm.

The amount of the additive (A) added to the random propylene copolymer (R-PP) which has left the outlet (O) of the second reactor system ($2^{nd}$ RS) depend very much on the used additive (A). However the amount of the additive (A) is preferably equal or below 5 wt.-%, more preferably equal or below 4 wt.-% based on the random propylene copolymer (R-PP), i.e. the random propylene copolymer (R-PP) discharged from the feeder (F). A preferred range of amount of additive (A) added to the random propylene copolymer (R-PP) is 0.05 to 6.0 wt.-%, more preferred 0.1 to 5.5 wt.-%.

Further, the additive (A) must be added to the random propylene copolymer (R-PP) at a specific point of time to the overall process to achieve the desired effect, namely an improvement of flowability. In other words the additive (A) must be fed to the random propylene copolymer (R-PP) at the latest at the powder silo (PS), preferably however at the latest at the feeder (F) of the purge bin (PB). Accordingly the additive (A) can be fed at any place between the outlet (O) of the second reactor system ($2^{nd}$ RS) and the powder silo (PS) of the reactor facility to the random propylene copolymer (R-PP). In an especially preferred embodiment the additive (A) can be fed at any place between the outlet (O) of the second reactor system ($2^{nd}$ RS) and the feeder (F) of the purge bin (PB) of the reactor facility to the random propylene copolymer (R-PP).

It is however especially preferred that the additive (A) is fed to the random propylene copolymer (R-PP) at (α) the outlet (O) of the second reactor system ($2^{nd}$ RS), or (β) the purge bin (PB), preferably at the conical part of the purge bin (PB), more preferably at the conical part of the purge bin (PB) just above the feeder (F), or (γ) the feeder (F), i.e. the rotary feeder (RF), of the purge bin (PB), preferably at the conical part of the feeder (F), i.e. at the conical part of the rotary feeder (RF), of the purge bin (PB).

Independently form the used means to fed the additive to the random propylene copolymer (R-PP), the feeding temperature is usually in the range of −20 to +50° C. and the feeding pressure is usually in the range of 0 to 50 bar. It is in particular appreciated that the additive (A) is added under inert atmosphere, i.e. no oxygen and/or water is present. Usually nitrogen is used to establish an inert atmosphere.

The additive (A) can be fed by any suitable means to the random propylene copolymer (R-PP). Possible solutions are for instance one or two screw feeders with appropriate feed hopper (see FIG. 1).

In a specific aspect of the present invention the additive (A) is the propylene homopolymer (H-PP) or the random propylene copolymer (R-PP1), to be more precisely the additive (A) is the propylene homopolymer (H-PP) or the random propylene copolymer (R-PP1) produced in the first reactor system ($1^{st}$ RS). Thus part of the propylene homopolymer (H-PP) or part of the random propylene copolymer (R-PP1) produced in the first reactor system ($1^{st}$ RS) is sidelined and not fed into the second reactor system ($2^{nd}$ RS) but fed to the random propylene copolymer (R-PP) discharged from the second reactor system ($2^{nd}$ RS). Accordingly the term "sidelined propylene homopolymer (H-PP)" or the term "sidelined random propylene copolymer (R-PP1)" or similar terms used in the present invention indicate that this propylene homopolymer (H-PP) or this random propylene copolymer (R-PP1) is not fed to the second reactor system ($2^{nd}$ RS) but fed to the produced the random propylene copolymer (R-PP) after having left the second reactor system ($2^{nd}$ RS).

More specifically, the sidelined propylene homopolymer (H-PP) or the sidelined random propylene copolymer (R-PP1) is fed to the random propylene copolymer (R-PP)

(α) at the outlet (O) of the second reactor system ($2^{nd}$ RS), or (β) at the purge bin (PB), preferably at the conical part of the purge bin (PB), more preferably at the conical part of the purge bin (PB) just above the feeder (F), or (γ) at the feeder (F), i.e. the rotary feeder (RF), of the purge bin (PB), preferably at the conical part of the feeder (F), i.e. at the conical part of the rotary feeder (RF), of the purge bin (PB), or (δ) at the powder silo (PS), preferably at the conical part of the powder silo (PS), or (ε) at the second conveying line (CL 2) between the outlet (O) and the purge bin (PB), or (ζ) at the conveying system (C) between the feeder (F) and the powder silo (PS).

Even more specifically, the sidelined propylene homopolymer (H-PP) or the sidelined random propylene copolymer (R-PP1) is fed to the random propylene copolymer (R-PP)

(α) at the outlet (O) of the second reactor system ($2^{nd}$ RS), or
(β) at the purge bin (PB), preferably at the conical part of the purge bin (PB), more preferably at the conical part of the purge bin (PB) just above the feeder (F), or
(γ) at the feeder (F), i.e. the rotary feeder (RF), of the purge bin (PB), preferably at the conical part of the feeder (F), i.e. at the conical part of the rotary feeder (RF), of the purge bin (PB), or
(δ) at the second conveying line (CL 2) between the outlet (O) and the purge bin (PB).

In other words a side stream (SS) of the propylene homopolymer (H-PP) or a side stream (SS) of the random propylene copolymer (R-PP1) produced in the first reactor system ($1^{st}$ RS) is used as the additive (A). Said side stream (SS) is preferably fed
(α) to the outlet (O) of the second reactor system ($2^{nd}$ RS), or
(β) to the purge bin (PB), preferably to the conical part of the purge bin (PB), more preferably to the conical part of the purge bin (PB) just above the feeder (F), or
(γ) to the feeder (F), i.e. to the rotary feeder (RF), of the purge bin (PB), preferably to the conical part of the feeder (F), i.e. to the conical part of the rotary feeder (RF), of the purge bin (PB), or
(δ) to the powder silo (PS), preferably to the conical part of the powder silo (PS), or
(ε) to the second conveying line (CL 2) between the outlet (O) and the purge bin (PB), or
(ζ) to the conveying system (C) between the feeder (F) and the powder silo (PS).

In particular preferred that the side stream (SS) of the propylene homopolymer (H-PP) or the side stream (SS) of the random propylene copolymer (R-PP1) produced in the first reactor system ($1^{st}$ RS) is fed
(α) to the outlet (O) of the second reactor system ($2^{nd}$ RS), or
(β) to the purge bin (PB), preferably to the conical part of the purge bin (PB), more preferably to the conical part of the purge bin (PB) just above the feeder (F), or
(γ) to the feeder (F), i.e. to the rotary feeder (RF), of the purge bin (PB), preferably to the conical part of the feeder (F), i.e. to the conical part of the rotary feeder (RF), of the purge bin (PB), or
(δ) to the second conveying line (CL 2) between the outlet (O) and the purge bin (PB).

It is especially preferred that the side stream (SS) of the propylene homopolymer (H-PP) or the side stream (SS) of the random propylene copolymer (R-PP1) produced in the first reactor system (1' RS) is fed to
(α) the outlet (O) of the second reactor system ($2^{nd}$ RS), or
(β) the feeder (F), i.e. to the rotary feeder (RF), of the purge bin (PB), preferably to the conical part of the feeder (F), i.e. to the conical part of the rotary feeder (RF), of the purge bin (PB).

The amount of the propylene homopolymer (H-PP) or the amount of the random propylene copolymer (R-PP1) produced in the first reactor system ($1^{st}$ RS) usually sidelined is up to 10 wt.-%, more preferably equal or less than 5 wt.-%. A preferred range is 0.5 to 10.0 wt.-%, more preferred 1.0 to 7.0 wt.-%, yet more preferred 1.5 to 5.0 wt.-%, like 3.0 to 5.0 wt.-%.

Accordingly the amount of the propylene homopolymer (H-PP) or the amount of the random propylene copolymer (R-PP1) produced in the first reactor system ($1^{st}$ RS) usually transferred to the second reactor system ($2^{nd}$ RS) is the main part, i.e. at least 90 wt.-%, at least 95 wt.-%. A preferred range of the propylene homopolymer (H-PP) or the random propylene copolymer (R-PP1) transferred to the second reactor system ($2^{nd}$ RS) is 90.0 to 99.5 wt.-%, more preferred 93.0 to 99.0 wt.-%, yet more preferred 95.0 to 98.5 wt.-%, like 95.0 to 97.0 wt.-%.

Taking the specific process in mind, the present invention discloses also a reactor facility which comprises in series
(i) a first reactor system ($1^{st}$ RS) comprising at least a slurry reactor (SR) and/or a gas phase reactor (GPR), preferably a first reactor system ($1^{st}$ RS) comprising a slurry reactor (SR) only, i.e. a first reactor system ($1^{st}$ RS) consisting of a slurry reactor (SR)
(ii) a first conveying line (CL 1) connecting the first reactor system ($1^{st}$ RS) with a second reactor system ($2^{nd}$ RS),
(iii) the second reactor system ($2^{nd}$ RS) comprising at least one gas phase reactor (GPR) and an outlet (O), preferably the second reactor system ($2^{nd}$ RS) comprising only one gas phase reactor (GPR) as polymerization unit and an outlet (O),
(iv) a second conveying line (CL 2) connecting the outlet (O) of the second reactor system ($2^{nd}$ RS) with a purge bin (PB),
(v) the purge bin (PB) comprising a feeder (F),
(vi) a conveying system (C) optionally comprising a powder silo (PS),
(vii) the conveying system (C) being connected with the feeder (F) of the purge bin (PB), and
(vii) optionally an extruder (E) connected with the conveying system (C),
wherein the reactor facility comprises additionally a side stream line (SSL) which
(a) preferably enables the transport of the propylene homopolymer (H-PP) or the transport of the random propylene copolymer (R-PP1) produced in the first reactor system ($1^{st}$ RS) and
(b) connects the first reactor system ($1^{st}$ RS) with
  (α) the outlet (O) of the second reactor system ($2^{nd}$ RS), or
  (β) the purge bin (PB), preferably the conical part of the purge bin (PB), or
  (γ) the feeder (F), i.e. at the rotary feeder, preferably the conical part of the feeder (F), i.e. the conical part of the rotary feeder, of the purge bin (PB), or
  (δ) the powder silo (PS), preferably the conical part of the powder silo (PS), or
  (ε) the second conveying line (CL 2) between the outlet (O) and the purge bin (PB), or
  (ζ) the conveying system (C) between the feeder (F) and the powder silo (PS).

Figure 2:
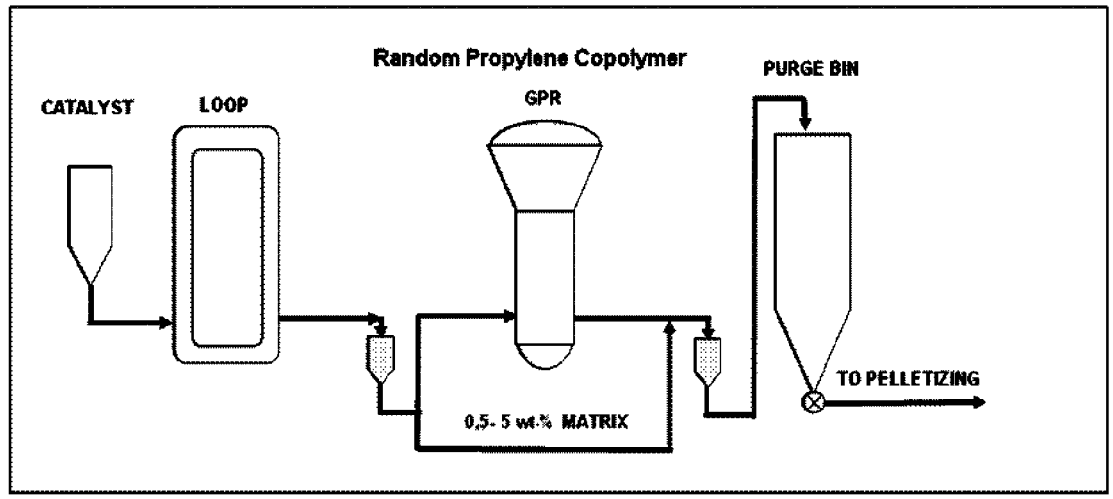
FIG. 2 is a schematic diagram of reactor systems for the preparation of a random propylene copolymer.

The present invention discloses in particular a reactor facility which comprises in series
(i) a first reactor system ($1^{st}$ RS) comprising at least a slurry reactor (SR) and/or a gas phase reactor (GPR), preferably a first reactor system (1' RS) comprising a slurry reactor (SR) only, i.e. a first reactor system ($1^{st}$ RS) consisting of a slurry reactor (SR),
(ii) a first conveying line (CL 1) connecting the first reactor system (1' RS) with a second reactor system ($2^{nd}$ RS),
(iii) the second reactor system ($2^{nd}$ RS) comprising at least one gas phase reactor (GPR) and an outlet (O), preferably the second reactor system ($2^{nd}$ RS) comprising only one gas phase reactor (GPR) as polymerization unit and an outlet (O),
(iv) a second conveying line (CL 2) connecting the outlet (O) of the second reactor system ($2^{nd}$ RS) with a purge bin (PB),
(v) the purge bin (PB) comprising a feeder (F),
(vi) a conveying system (C) optionally comprising a powder silo (PS), (vii) the conveying system (C) being connected with the feeder (F) of the purge bin (PB), and
(vii) optionally an extruder (E) connected with the conveying system (C), wherein the reactor facility comprises additionally a side stream line (SSL) which
(a) preferably enables the transport of the propylene homopolymer (H-PP) or the transport of the random propylene copolymer (R-PP1) produced in the first reactor system ($1^{st}$ RS) and
(b) connects the first reactor system ($1^{st}$ RS) with
(α) the outlet (O) of the second reactor system ($2^{nd}$ RS), or
(β) the purge bin (PB), preferably the conical part of the purge bin (PB), more preferably the conical part of the purge bin (PB) just above the feeder (F), or
(γ) the feeder (F), i.e. the rotary feeder (RF), of the purge bin (PB), preferably the conical part of the feeder (F), i.e. the conical part of the rotary feeder (RF), of the purge bin (PB), or
(δ) the second conveying line (CL 2) between the outlet (O) and the purge bin (PB), (see FIG. 2).

Preferably the side stream line (SSL) is connected with the outlet (O) of the second reactor system ($2^{nd}$ RS) and/or the conical part of the feeder (F).

The specific embodiments for the individual parts of the reactor facility are the same as discussed above. Accordingly the first reactor system (1' RS) may comprise, preferably consist of, a slurry reactor, i.e. loop reactor. On the other hand the second reactor system ($2^{nd}$ RS) may comprise one or two gas phase reactors (GPRs), preferably comprises, yet more preferably consist of, one gas phase reactor (GPR). Therefore, in case the first reactor system (1' RS) comprises only a slurry reactor (SR) as polymerization unit, than part of the propylene homopolymer (H-PP) or part of the random propylene copolymer (R-PP1) is sidelined from said slurry reactor (SR).

To enable in a sufficient manner the transport of the propylene homopolymer (H-PP) or the random propylene copolymer (R-PP1) via the side stream line (SSL) a high pressure flash after the first reactor system ($1^{st}$ RS) with an XCV valves as well as a high pressure flash with a separate feed hopper and rotary feeder can be used.

Thus in a very specific embodiment, the inventive method is defined as a method for the preparation of a random propylene copolymer (R-PP) in a reactor facility, wherein
(A) the reactor facility comprises in series
(i) a first reactor system ($1^{st}$ RS) comprising at least a slurry reactor (SR) and/or at least one gas phase reactor (GPR), preferably a first reactor system ($1^{st}$ RS) comprising only one slurry reactor (SR) as polymerization unit, i.e. a first reactor system ($1^{st}$ RS) consisting of one slurry reactor (SR),
(ii) a first conveying line (CL 1) connecting the first reactor system ($1^{st}$ RS) with a second reactor system ($2^{nd}$ RS),
(iii) the second reactor system ($2^{nd}$ RS) comprising at least one gas phase reactor (GPR) and an outlet (O), preferably the second reactor system ($2^{nd}$ RS) comprising only one gas phase reactor (GPR) as polymerization unit and an outlet (O),
(iv) a second conveying line (CL 2) connecting the outlet (O) of the second reactor system ($2^{nd}$ RS) with a purge bin (PB) comprising a feeder (F),
(v) a conveying system (C) optionally comprising a powder silo (PS),
(vi) the conveying system (C) being connected with the feeder (F) of the purge bin (PB), and
(vii) optionally an extruder (E) connected with the conveying system (C), and additionally the reactor facility comprises a side stream line (SSL) which connects the first reactor system ($1^{st}$ RS), i.e. either the slurry reactor (SR) of the first reactor system ($1^{st}$ RS) (if the first reactor system ($1^{st}$ RS) does not comprise a gas phase reactor (GPR), i.e. comprises only of slurry reactor (SR) as polymerization unit) or the gas phase reactor (GPR) of the first reactor system ($1^{st}$ RS) (if the first reactor system ($1^{st}$ RS) comprises a slurry reactor (SR) and a gas phase reactor (GPR)), with
(α) the outlet (O) of the second reactor system ($2^{nd}$ RS), or
(β) the purge bin (PB), preferably the conical part of the purge bin (PB), or
(γ) the feeder (F), i.e. the rotary feeder, preferably the conical part of the feeder (F), i.e. the conical part of the rotary feeder, of the purge bin (PB), or
(δ) the powder silo (PS), preferably the conical part of the powder silo (PS), or
(ε) at the second conveying line (CL 2) between the outlet (O) and the purge bin (PB), or
(ζ) the conveying system (C) between the feeder (F) and the powder silo (PS),
(B) the preparation of said random propylene copolymer (R-PP) comprises the steps in the order of
(a) producing in said first reactor system ($1^{st}$ RS) a propylene homopolymer (H-PP) or a random propylene copolymer (R-PP1),
(b) transferring a part of said propylene homopolymer (H-PP) or a part of said random propylene copolymer (R-PP1), preferably 80.0 to 99.5 wt.-% of said propylene homopolymer (H-PP) or of said random propylene copolymer (R-PP1), more preferably 93.0 to 99.0 wt.-% of said propylene homopolymer (H-PP) or of said random propylene copolymer (R-PP1), yet more preferably 95.0 to 98.5 wt.-% of said propylene homopolymer (H-PP) or of said random propylene copolymer (R-PP1), to said second reactor system ($2^{nd}$ RS) via the first conveying line (CL 1),
(c) producing in said second reactor system ($2^{nd}$ RS) in the presence of said propylene homopolymer (H-PP) or in the presence of said random propylene copolymer (R-PP1) a further random propylene copolymer (R-PP2) obtaining the random propylene copolymer (R-PP),
(d) discharging said random propylene copolymer (R-PP) from said second reactor system ($2^{nd}$ RS) via the outlet (O),
(e) transferring said discharged random propylene copolymer (R-PP) via the second conveying line (CL 2) to said purge bin (PB) comprising said feeder (F), and
(f) transferring further said discharged random propylene copolymer (R-PP) from said purge bin (PB) via said feeder (F) to said conveying system (C), optionally to the powder silo (PS) of the conveying system (C),
(g) optionally extruding the random propylene copolymer (R-PP) in the extruder (E) to pellets,
(C) the produced random propylene copolymer (R-PP) is provided with an additive (A) being the remaining part of the propylene homopolymer (H-PP) or being the remaining part of the random propylene copolymer (R-PP1) which has been not transferred to the second reactor system ($2^{nd}$ RS) but has been sidelined via the side stream line (SSL), said additive (A), i.e. the sidelined propylene homopolymer (H-PP) or the sidelined random propylene copolymer (R-PP1), is fed to the produced random propylene copolymer (R-PP)

(α) at the outlet (O) of the second reactor system ($2^{nd}$ RS), or
(β) at the purge bin (PB), preferably at the conical part of the purge bin (PB), or
(γ) at the feeder (F), i.e. at the rotary feeder, preferably at the conical part of the feeder (F), i.e. at the conical part of the rotary feeder, of the purge bin (PB), or
(δ) at the powder silo (PS), preferably at the conical part of the powder silo (PS), or
(ε) at the second conveying line (CL 2) between the outlet (O) and the purge bin (PB), or
(ζ) at the conveying system (C) between the feeder (F) and the powder silo (PS), and (D) the produced random propylene copolymer (R-PP) after being treated with the additive (A), i.e. after having left the powder silo (PS) and/or the purge bin (PB),
(i) has a xylene cold soluble fraction (XCS) of at least 5 wt.-%, preferably of at least 7 wt.-%, more preferably of at least 9 wt.-%, yet more preferably of at least 15 wt.-%, like of at least 18 wt.-%, and
(ii) comprises units derived from at least one C2 to C20 α-olefin other than propylene in an amount of 4.0 to 25.0 wt.-%, preferably 5.0 to 22.0 wt.-%, more preferably 10.0 to 20.0 wt.-%, like 5 to 15 wt.-%.

Thus in a very preferred embodiment, the inventive method is defined as a method for the preparation of a random propylene copolymer (R-PP) in a reactor facility, wherein
(A) the reactor facility comprises in series
(i) a first reactor system ($1^{st}$ RS) comprising at least a slurry reactor (SR) and/or at least one gas phase reactor (GPR), preferably a first reactor system ($1^{st}$ RS) comprising only one slurry reactor (SR) as polymerization unit, i.e. a first reactor system ($1^{st}$ RS) consisting of one slurry reactor (SR),
(ii) a first conveying line (CL 1) connecting the first reactor system ($1^{st}$ RS) with a second reactor system ($2^{nd}$ RS),
(iii) the second reactor system ($2^{nd}$ RS) comprising at least one gas phase reactor (GPR) and an outlet (O), preferably the second reactor system ($2^{nd}$ RS) comprising only one gas phase reactor (GPR) as polymerization unit and an outlet (O),
(iv) a second conveying line (CL 2) connecting the outlet (O) of the second reactor system ($2^{nd}$ RS) with a purge bin (PB) comprising a feeder (F),
(v) a conveying system (C) optionally comprising a powder silo (PS),
(vi) the conveying system (C) being connected with the feeder (F) of the purge bin (PB), and
(vii) optionally an extruder (E) connected with the conveying system (C), and additionally a side stream line (SSL) which connects the first reactor system ($1^{st}$ RS), i.e. either the slurry reactor (SR) of the first reactor system ($1^{st}$ RS) (if the first reactor system ($1^{st}$ RS) does not comprise a gas phase reactor (GPR), i.e. comprises only of slurry reactor (SR) as polymerization unit) or the gas phase reactor (GPR) of the first reactor system ($1^{st}$ RS) (if the first reactor system ($1^{st}$ RS) comprises a slurry reactor (SR) and a gas phase reactor (GPR)), with
(α) the outlet (O) of the second reactor system ($2^{nd}$ RS), or
(β) the purge bin (PB), preferably the conical part of the purge bin (PB), more preferably the conical part of the purge bin (PB) just above the feeder (F), or
(γ) the feeder (F), i.e. the rotary feeder (RF), of the purge bin (PB), preferably the conical part of the feeder (F), i.e. the conical part of the rotary feeder (RF), of the purge bin (PB), or
(δ) the second conveying line (CL 2) between the outlet (O) and the purge bin (PB), (B) the preparation of said random propylene copolymer (R-PP) comprises the steps in the order of
(a) producing in said first reactor system ($1^{st}$ RS) a propylene homopolymer (H-PP) or a random propylene copolymer (R-PP1),
(b) transferring a part of said propylene homopolymer (H-PP) or a part of said random propylene copolymer (R-PP1), preferably 80.0 to 99.5 wt.-% of said propylene homopolymer (H-PP) or of said random propylene copolymer (R-PP1), more preferably 93.0 to 99.0 wt.-% of said propylene homopolymer (H-PP) or of said random propylene copolymer (R-PP1), yet more preferably 95.0 to 98.5 wt.-% of said propylene homopolymer (H-PP) or of said random propylene copolymer (R-PP1), to said second reactor system ($2^{nd}$ RS) via the first conveying line (CL 1),
(c) producing in said second reactor system ($2^{nd}$ RS) in the presence of said propylene homopolymer (H-PP) or of said random propylene copolymer (R-PP1) a further random propylene copolymer (R-PP2) obtaining the random propylene polymer (R-PP),
(d) discharging said random propylene copolymer (R-PP) from said second reactor system ($2^{nd}$ RS) via the outlet (O),
(e) transferring said discharged random propylene copolymer (R-PP) via the second conveying line (CL 2) to said purge bin (PB) comprising said feeder (F), and
(f) transferring further said discharged random propylene copolymer (R-PP) from said purge bin (PB) via said feeder (F) to said conveying system (C), optionally to the powder silo (PS) of the conveying system (C),
(g) optionally extruding the random propylene copolymer (R-PP) in the extruder (E) to pellets, (C) the produced random propylene copolymer (R-PP) is provided with an additive (A) being the remaining part of the propylene homopolymer (H-PP) or being the remaining part of the random propylene copolymer (R-PP1) which has been not transferred to the second reactor system ($2^{nd}$ RS) but has been sidelined via the side stream line (SSL), said additive (A), i.e. the sidelined propylene homopolymer (H-PP) or the sidelined random propylene copolymer (R-PP1), is fed to the produced random propylene copolymer (R-PP)
(α) at the outlet (O) of the second reactor system ($2^{nd}$ RS), or
(β) at the purge bin (PB), preferably at the conical part of the purge bin (PB), more preferably at the conical part of the purge bin (PB) just above the feeder (F), or
(γ) at the feeder (F), i.e. at the rotary feeder (RF), of the purge bin (PB), preferably at the conical part of the feeder (F), i.e. at the conical part of the rotary feeder (RF), of the purge bin (PB), or
(δ) at the second conveying line (CL 2) between the outlet (O) and the purge bin (PB),
and
(D) the produced random propylene copolymer (R-PP) after having left the purge bin (PB) via the feeder (F)
(i) has a xylene cold soluble fraction (XCS) of at least 5 wt.-%, preferably of at least 7 wt.-%, more preferably of at least 9 wt.-%, yet more preferably of at least 15 wt.-%, like of at least 18 wt.-%, and
(ii) comprises units derived from at least one C2 to C20 α-olefin other than propylene in an amount of 4.0 to 25.0 wt.-%, preferably 5.0 to 22.0 wt.-%, more preferably 10.0 to 20.0 wt.-%, like 5 to 15 wt.-%.

Concerning the individual polymer components produced, i.e. the propylene homopolymer (H-PP), the random propylene copolymer (R-PP1), the random propylene copolymer (R-PP2) and the random propylene copolymer (R-PP), and the specific preferred embodiments thereof it is referred to the definitions given above.

The present invention will now be described in further detail by the examples provided below.

EXAMPLES

1. Definitions/Measuring Methods

The following definitions of terms and determination methods apply for the above general description of the invention as well as to the below examples unless otherwise defined. Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Intrinsic Viscosity

The intrinsic viscosity (IV) is determined according to ISO 1628-1 at 135° C. with decaline as solvent.

Randomness

In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure -P-E-P- (one ethylene unit between propylene units), occurs at 733 cm$^{-1}$. This band characterizes the random ethylene content. For longer ethylene sequences (more than two units), an absorption band occurs at 720 cm$^1$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C-NMR. (Thermochimica Acta, 66 (1990) 53-68).

Randomness=random ethylene(-P-E-P-)content/the total ethylene content×100%.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988) .and Chujo R, et al, Polymer 35 339 (1994).

The NMR-measurement was used for determining the mmmm pentad concentration in a manner well known in the art.

MFR$_2$ is measured according to ISO 1133 (230° C., 2.16 kg load).

Comonomer content of C2 is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —CH$_2$-absorption peak (800-650 cm$^{-1}$) was measured with Perkin Elmer FTIR 1600 spectrometer. The method was calibrated by ethylene content data measured by $^{13}$C-NMR.

The xylene cold solubles (XCS, wt.-%): Content of xylene cold solubles (XCS) is determined at 23° C. according ISO 6427.

Figure 3:
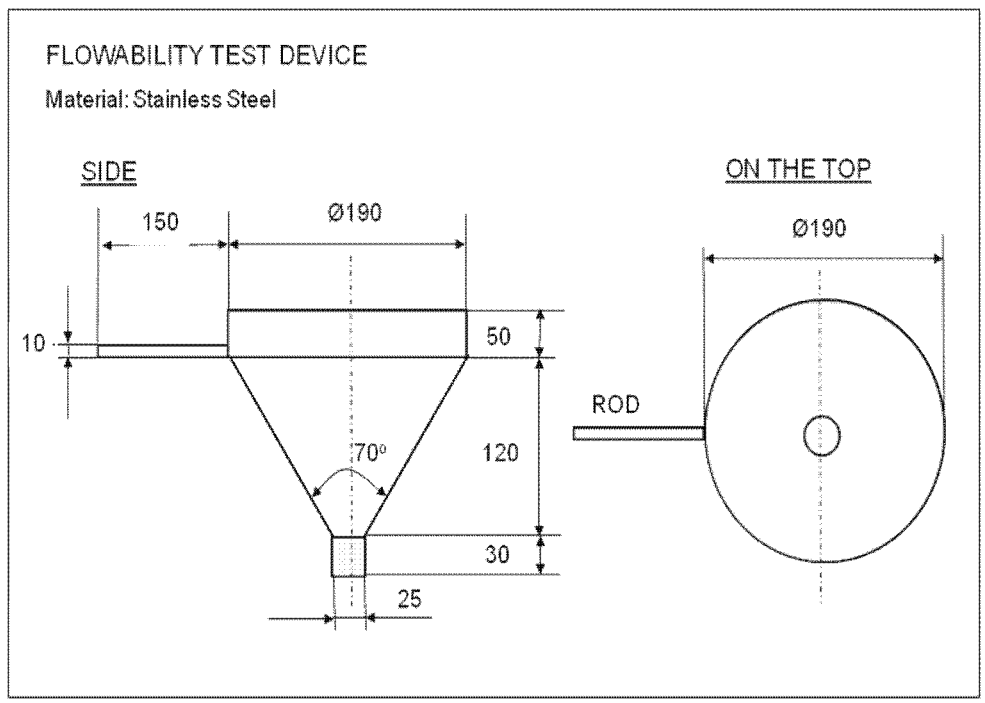
FIG. 3 is a schematic diagram of a flowability test device which is used to determine flowability.

Mean particle size is measured with Coulter Counter LS200 at room temperature with n-heptane as medium; particle sizes below 100 nm by transmission electron microscopy Flowability 300±0.5 g polymer powder sample was weighed in a decanter. The polymer powder was poured to the other decanter having the same size. This was repeated altogether 5 times. After that the flowability was measured by letting this sample flow through a funnel at room temperature. The time it takes for a sample to flow through is a measurement of stickiness. The average of 3 separate determinations was defined as flowability as a unit second. The dimensions of the funnel can be deducted from FIG. 3.

We claim:

1. Method for the preparation of a random propylene copolymer (R-PP) in a reactor facility, wherein
   (A) the reactor facility comprises in series
     (i) a first reactor system (1$^{st}$ RS) comprising at least a slurry reactor (SR) and/or at least one gas phase reactor (GPR),
     (ii) a first conveying line (CL 1) connecting the first reactor system (1$^{st}$ RS) with a second reactor system (2$^{nd}$ RS),
     (iii) the second reactor system (2$^{nd}$ RS) comprising at least one gas phase reactor (GPR) and an outlet (O),
     (iv) a second conveying line (CL 2) connecting the outlet (O) of the second reactor system (2$^{nd}$ RS) with a purge bin (PB) comprising a feeder (F),
     (v) a conveying system (C) optionally comprising a powder silo (PS),
     (vi) the conveying system (C) being connected with the feeder (F) of the purge bin (PB), and
     (vii) optionally an extruder (E) connected with the conveying system (C),
   (B) the preparation of said random propylene copolymer (R-PP) comprises the steps in the order of
     (a) producing in said first reactor system (1$^{st}$ RS) a propylene homopolymer (H-PP) or a random propylene copolymer (R-PP1),
     (b) transferring at least a part of said propylene homopolymer (H-PP) or a part of said random propylene copolymer (R-PP1) to said second reactor system (2$^{nd}$ RS) via the first conveying line (CL 1),
     (c) producing in said second reactor system (2$^{nd}$ RS) in the presence of said propylene homopolymer (H-PP) or in the presence of said random propylene copolymer (R-PP1) a further random propylene copolymer (R-PP2) obtaining the random propylene copolymer (R-PP),
     (d) discharging said random propylene copolymer (R-PP) from said second reactor system (2$^{nd}$ RS) via the outlet (O),
     (e) transferring said discharged random propylene copolymer (R-PP) via the second conveying line (CL 2) to said purge bin (PB) comprising said feeder (F), and
     (f) transferring further said discharged random propylene copolymer (R-PP) from said purge bin (PB) via said feeder (F) to said conveying system (C), optionally to the powder silo (PS) of the conveying system (C),
     (g) optionally extruding the random propylene copolymer (R-PP) in the extruder (E) to pellets,
   (C) the produced random propylene copolymer (R-PP) is provided with an additive (A), said additive (A) is a polypropylene having a xylene cold soluble fraction (XCS) of equal or below 5.0 wt.-% and is fed to the produced random propylene copolymer (R-PP)

(α) at the outlet (O) of the second reactor system ($2^{nd}$ RS), and/or (β) at the purge bin (PB), and/or (γ) at the feeder (F), i.e. at the rotary feeder, of the purge bin (PB), and/or (δ) at the powder silo (PS), and/or (ε) at the second conveying line (CL 2) between the outlet (O) and the purge bin (PB), and/or (ζ) at the conveying system (C) between the feeder (F) and the powder silo (PS), and (D) the produced random propylene copolymer (R-PP) after being treated with the additive (A)

(i) has a xylene cold soluble fraction (XCS) of at least 5 wt.-% and (ii) comprises units derived from at least one C2 to C20 α-olefin other than propylene in an amount of 4.0 to 25.0 wt.-%.

2. Method for the preparation of a random propylene copolymer (R-PP) in a reactor facility wherein (A) the reactor facility comprises in series (i) a first reactor system ($1^{st}$ RS) comprising at least a slurry reactor (SR) and/or at least one gas phase reactor (GPR), (ii) a first conveying line (CL 1) connecting the first reactor system ($1^{st}$ RS) with a second reactor system ($2^{nd}$ RS), (iii) the second reactor system ($2^{nd}$ RS) comprising at least one gas phase reactor and an outlet (O), (iv) a second conveying line (CL 2) connecting the outlet (O) of the second reactor system ($2^{nd}$ RS) with a purge bin (PB) comprising a feeder (F), (v) a conveying system (C) optionally comprising a powder silo (PS), (vi) the conveying system (C) being connected with the feeder (F) of the purge bin (PB), and (vii) optionally an extruder (E) connected with the conveying system (C), (B) the preparation of said random propylene copolymer (R-PP) comprises the steps in the order of (a) producing in said first reactor system ($1^{st}$ RS) a propylene homopolymer (H-PP) or a random propylene copolymer (R-PP1), (b) transferring at least a part of said propylene homopolymer (H-PP) or a part of said random propylene copolymer (R-PP1) to said second reactor system ($2^{nd}$ RS) via the first conveying line (CL 1), (c) producing in said second reactor system ($2^{nd}$ RS) in the presence of said propylene homopolymer (H-PP) or in the presence of said random propylene copolymer (R-PP1) a further random propylene copolymer (R-PP2) obtaining the random propylene copolymer (R-PP), (d) discharging said random propylene copolymer (R-PP) from said second reactor system ($2^{nd}$ RS) via the outlet (O), (e) transferring said discharged random propylene copolymer (R-PP) via the second conveying line (CL 2) to said purge bin (PB) comprising said feeder (F), and (f) transferring further said discharged random propylene copolymer (R-PP) from said purge bin (PB) via said feeder (F) to said conveying system (C), optionally to the powder silo (PS) of the conveying system (C), (g) optionally extruding the random propylene copolymer (R-PP) in the extruder (E) to pellets, (C) the produced random propylene copolymer (R-PP) is provided with an additive (A), said additive (A) is a polypropylene having a xylene cold soluble fraction (XCS) of equal or below 5.0 wt.-% and is fed to the produced random propylene copolymer (R-PP)

(α) at the outlet (O) of the second reactor system ($2^{nd}$ RS), and/or (β) at the purge bin (PB), and/or (γ) at the feeder (F) of the purge bin (PB), and/or (δ) at the second conveying line (CL 2) between the outlet (O) and the purge bin (PB), and (D) the produced random propylene copolymer (R-PP) after having left the purge bin (PB) via the feeder (F)

(i) has a xylene cold soluble fraction (XCS) of at least 5 wt.-% and (ii) comprises units derived from at least one C2 to C20 α-olefin other than propylene in an amount of 4.0 to 25.0 wt.-%.

3. Method according to claim 1, wherein the propylene homopolymer (H-PP) or the random propylene copolymer (R-PP1) produced in step (a) has a lower xylene cold soluble fraction (XCS) than the random propylene copolymer (R-PP2) produced in step (c).

4. Method according to claim 1, wherein random propylene copolymer (R-PP) comprises 30 to 70 wt.-% of the propylene homopolymer (H-PP) or of the random propylene copolymer (R-PP1) and 70 to 30 wt.-% of the random propylene copolymer (R-PP2), based on the random propylene copolymer (R-PP).

5. Method according to claim 1, wherein the random propylene copolymer (R-PP2)

(a) comprises units derived from propylene and at least another α-olefin selected from the group consisting of ethylene, 1-butene, 1-pentene, 1-hexene, 1-heptene, 1-octene and mixtures thereof, and/or (b) the amount of units derived from other than propylene in the random propylene copolymer (R-PP2) is 6.0 to 35.0 wt.-%.

6. Method according to claim 1, wherein the amount of additive (A) is equal or below 5.0 wt.-% based on the random propylene copolymer (R-PP).

7. Method according to claim 1, wherein the additive (A)

(a) has the capability to reduce the stickiness of the sticky surface of the random propylene copolymer (R-PP) and/or (b) coats the surface of the random propylene copolymer (R-PP).

8. Method according to claim 1, wherein the additive (A) is the propylene homopolymer (H-PP) or the random propylene copolymer (R-PP1) produced in the first reactor system ($1^{st}$ RS).

9. Method according to claim 1, wherein a side stream (SS) of the propylene homopolymer (H-PP) or a side stream (SS) of the random propylene copolymer (R-PP1) produced in the first reactor system ($1^{st}$ RS) is used as the additive (A).

10. Method according to claim 9, wherein the side stream (SS) is sidelined from the first reactor system ($1^{st}$ RS) and is fed (α) to the outlet (O) of the second reactor system ($2^{nd}$ RS), or (β) to the purge bin (PB), or (γ) to the feeder (F) of the purge bin (PB), or (δ) to the powder silo (PS), or (ε) to the second conveying line (CL 2) between the outlet (O) and the purge bin (PB), or (ζ) to the conveying system (C) between the feeder (F) and the powder silo (PS).

11. Method according to claim 1, wherein
(A) the reactor facility comprises in series
  (i) a first reactor system ($1^{st}$ RS) comprising at least a slurry reactor (SR) and/or at least one gas phase reactor (GPR),
  (ii) a first conveying line (CL 1) connecting the first reactor system ($1^{st}$ RS) with a second reactor system ($2^{nd}$ RS),
  (iii) the second reactor system ($2^{nd}$ RS) comprising at least one gas phase reactor (GPR) and an outlet (O),
  (iv) a second conveying line (CL 2) connecting the outlet (O) of the second reactor system ($2^{nd}$ RS) with a purge bin (PB) comprising a feeder (F),
  (v) a conveying system (C) optionally comprising a powder silo (PS),
  (vi) the conveying system (C) being connected with the feeder (F) of the purge bin (PB), and
  (vii) optionally an extruder (E) connected with the conveying system (C), and additionally the reactor facility comprises a side stream line (SSL) which connects the first reactor system ($1^{st}$ RS) with
    (α) the outlet (O) of the second reactor system ($2^{nd}$ RS), or
    (β) the purge bin (PB), or
    (γ) the feeder (F), i.e. the rotary feeder, of the purge bin (PB), or
    (δ) the powder silo (PS), or
    (ε) the second conveying line (CL 2) between the outlet (O) and the purge bin (PB), or
    (ζ) the conveying system (C) between the feeder (F) and the powder silo (PS),
(B) the preparation of said random propylene copolymer (R-PP) comprises the steps in the order of
  (a) producing in said first reactor system ($1^{st}$ RS) a propylene homopolymer (H-PP) or a random propylene copolymer (R-PP1),
  (b) transferring one part of said propylene homopolymer (H-PP) or part of said random propylene copolymer (R-PP1) to said second reactor system ($2^{nd}$ RS) via the first conveying line (CL 1),
  (c) producing in said second reactor system ($2^{nd}$ RS) in the presence of said propylene homopolymer (H-PP) or of said random propylene copolymer (R-PP1) a further random propylene copolymer (R-PP2) obtaining the random propylene copolymer (R-PP),
  (d) discharging said random propylene copolymer (R-PP) from said second reactor system ($2^{nd}$ RS) via the outlet (O),
  (e) transferring said discharged random propylene copolymer (R-PP) via the second conveying line (CL 2) to said purge bin (PB) comprising said feeder (F), and
  (f) transferring further said discharged random propylene copolymer (R-PP) from said purge bin (PB) via said feeder (F) to said conveying system (C), optionally to the powder silo (PS) of the conveying system (C),
  (g) optionally extruding the random propylene copolymer (R-PP) in the extruder (E) to pellets,
(C) the produced random propylene copolymer (R-PP) is provided with an additive (A) being the remaining part of the propylene homopolymer (H-PP) or being the remaining part of the random propylene copolymer (R-PP1) which has been not transferred to the second reactor system ($2^{nd}$ RS) but has been sidelined via the side stream line (SSL), said additive (A), i.e. the sidelined propylene homopolymer (H-PP) or the sidelined random propylene copolymer (R-PP1), is fed to the produced random propylene copolymer (R-PP)
  (α) at the outlet (O) of the second reactor system ($2^{nd}$ RS), or
  (β) at the purge bin (PB), or
  (γ) at the feeder (F), i.e. at the rotary feeder, of the purge bin (PB), or
  (δ) at the powder silo (PS), or
  (ε) at the second conveying line (CL 2) between the outlet (O) and the purge bin (PB), or
  (ζ) at the conveying system (C) between the feeder (F) and the powder silo (PS), and
(D) the produced random propylene copolymer (R-PP) after being treated with the additive (A)
  (i) has a xylene cold soluble fraction (XCS) of at least 5 wt.-% and
  (ii) comprises units derived from at least one C2 to C20 α-olefin other than propylene in an amount of 4.0 to 25.0 wt.-%.

12. Method according to claim 11, wherein the reactor facility comprises a side stream line (SSL) which connects the first reactor system ($1^{st}$ RS) with
  (α) the outlet (O) of the second reactor system ($2^{nd}$ RS), or
  (β) the purge bin (PB), or
  (γ) the feeder (F), i.e. the rotary feeder, of the purge bin (PB), or
  (δ) the second conveying line (CL 2) between the outlet (O) and the purge bin (PB),
and the produced random propylene copolymer (R-PP) is provided with an additive (A) being the remaining part of the propylene homopolymer (H-PP) or being the remaining part of the random propylene copolymer (R-PP1) which has been not transferred to the second reactor system ($2^{nd}$ RS) but has been sidelined via the side stream line (SSL), said additive (A), i.e. the sidelined propylene homopolymer (H-PP) or the sidelined random propylene copolymer (R-PP1), is fed to the produced random propylene copolymer (R-PP)
  (α) at the outlet (O) of the second reactor system ($2^{nd}$ RS), or
  (β) at the purge bin (PB), or
  (γ) at the feeder (F), i.e. at the rotary feeder, of the purge bin (PB), or
  (δ) at the second conveying line (CL 2) between the outlet (O) and the purge bin (PB), and
the produced random propylene copolymer (R-PP) after having left the purge bin (PB) via the feeder (F)
  (i) has a xylene cold soluble fraction (XCS) of at least 5 wt.-% and
  (ii) comprises units derived from at least one C2 to C20 α-olefin other than propylene in an amount of 4.0 to 25.0 wt.-%.

13. Method according to claim 12, wherein the first reactor system ($1^{st}$ RS) comprises only a slurry reactor (SR) as polymerisation unit and the side stream line (SSL) connects said slurry reactor (SR) with
  (α) the outlet (O) of the second reactor system ($2^{nd}$ RS), or
  (β) the purge bin (PB), or
  (γ) the feeder (F), i.e. the rotary feeder (RF), of the purge bin (PB), or
  (δ) the second conveying line (CL 2) between the outlet (O) and the purge bin (PB).

14. Method according to claim 1, wherein the additive (A) is fed via a hopper (H) to
- (α) the outlet (O) of the second reactor system ($2^{nd}$ RS), or
- (β) the purge bin (PB), or
- (γ) the feeder (F), of the purge bin (PB), or
- (δ) the powder silo (PS), or
- (ε) the second conveying line (CL 2) between the outlet (O) and the purge bin (PB), or
- (ζ) the conveying system (C) between the feeder (F) and the powder silo (PS).

15. A method for producing a random propylene copolymer (R-PP) in a reactor facility comprising the steps of:
- (A) providing an additive (A), said additive (A) is a polypropylene wherein
- (B) the random propylene copolymer (R-PP)
    - (i) has a xylene cold soluble fraction (XCS) of at least 5 wt.-% and
    - (ii) comprises units derived from at least one C2 to C20 α-olefin other than propylene in an amount of 4.0 to 25.0 wt.-%.
- (C) the reactor facility comprises in series
    - (i) a first reactor system ($1^{st}$ RS) comprising at least a slurry reactor (SR) and/or at least one gas phase reactor (GPR),
    - (ii) a first conveying line (CL 1) connecting the first reactor system ($1^{st}$ RS) with a second reactor system ($2^{nd}$ RS),
    - (iii) the second reactor system ($2^{nd}$ RS) comprising at least one gas phase reactor (GPR) and an outlet (O),
    - (iv) a second conveying line (CL 2) connecting the outlet (O) of the second reactor system ($2^{nd}$ RS) with a purge bin (PB) comprising a feeder (F),
    - (v) a conveying system (C) optionally comprising a powder silo (PS),
    - (vi) the conveying system (C) being connected with the feeder (F) of the purge bin (PB), and
    - (vii) optionally an extruder (E) connected with the conveying system (C), wherein further
        - (a) in said first reactor system ($1^{st}$ RS) a propylene homopolymer (H-PP) or a random propylene copolymer (R-PP1) is produced,
        - (b) in said second reactor system ($2^{nd}$ RS) in the presence of said propylene homopolymer (H-PP) or in the presence of said random propylene copolymer (R-PP1) a further random propylene copolymer (R-PP2) is produced obtaining the random propylene copolymer (R-PP),
        - (c) said random propylene copolymer (R-PP) is discharged from said second reactor system ($2^{nd}$ RS) via the outlet (O),
        - (e) said discharged random propylene copolymer (R-PP) is transferred via the second conveying line (CL 2) to said purge bin (PB) comprising said feeder (F), and
        - (f) said discharged random propylene copolymer (R-PP) is further transferred from said purge bin (PB) via said feeder (F) to said conveying system (C), optionally to the powder silo (PS) of the conveying system (C),
        - (g) optionally the random propylene copolymer (R-PP) is extruded to pellets,
- (D) feeding the additive (A) to the produced random propylene copolymer (R-PP)
    - (α) at the outlet (O) of the second reactor system ($2^{nd}$ RS), and/or
    - (β) at the purge bin (PB), and/or
    - (γ) at the feeder (F) of the purge bin (PB), and/or
    - (δ) at the powder silo (PS), and/or
    - (ε) at the second conveying line (CL 2) between the outlet (O) and the purge bin (PB), and/or
    - (ζ) at the conveying system (C) between the feeder (F) and the powder silo (PS),
to improve the flowability of the random propylene copolymer (R-PP) compared to the same random propylene copolymer (R-PP) but being not treated with an additive (A) at this stage.

\* \* \* \* \*